R. I. SMITH.
FOUR HORSE EVENER.
APPLICATION FILED FEB. 12, 1913.

1,091,711.

Patented Mar. 31, 1914.
2 SHEETS—SHEET 2.

Witnesses.
F. L. Chase
Frank Hazen.

Inventor:
Richard I. Smith

UNITED STATES PATENT OFFICE.

RICHARD I. SMITH, OF CROFTON, NEBRASKA.

FOUR-HORSE EVENER.

1,091,711.

Specification of Letters Patent. Patented Mar. 31, 1914.

Application filed February 12, 1913. Serial No. 748,045.

*To all whom it may concern:*

Be it known that I, RICHARD I. SMITH, a citizen of the United States, residing at Crofton, in the county of Knox and State of Nebraska, have invented a new and useful Four-Horse Evener, of which the following is a specification.

The device forming the subject matter of this application is an evener or draft equalizer, adapted, primarily, although not necessarily, to equalize the draft among four horses when the same are attached to a plow.

One object of the present invention is to effect an equitable distribution of the load among the several draft animals.

Another object of the invention is to provide novel means whereby, through a movement of certain constituent portions of the equalizer, the load will be fairly distributed among the several draft animals when the thickness of the furrow-slice is changed.

It is within the scope of the invention to improve generally and to enhance the utility of, devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
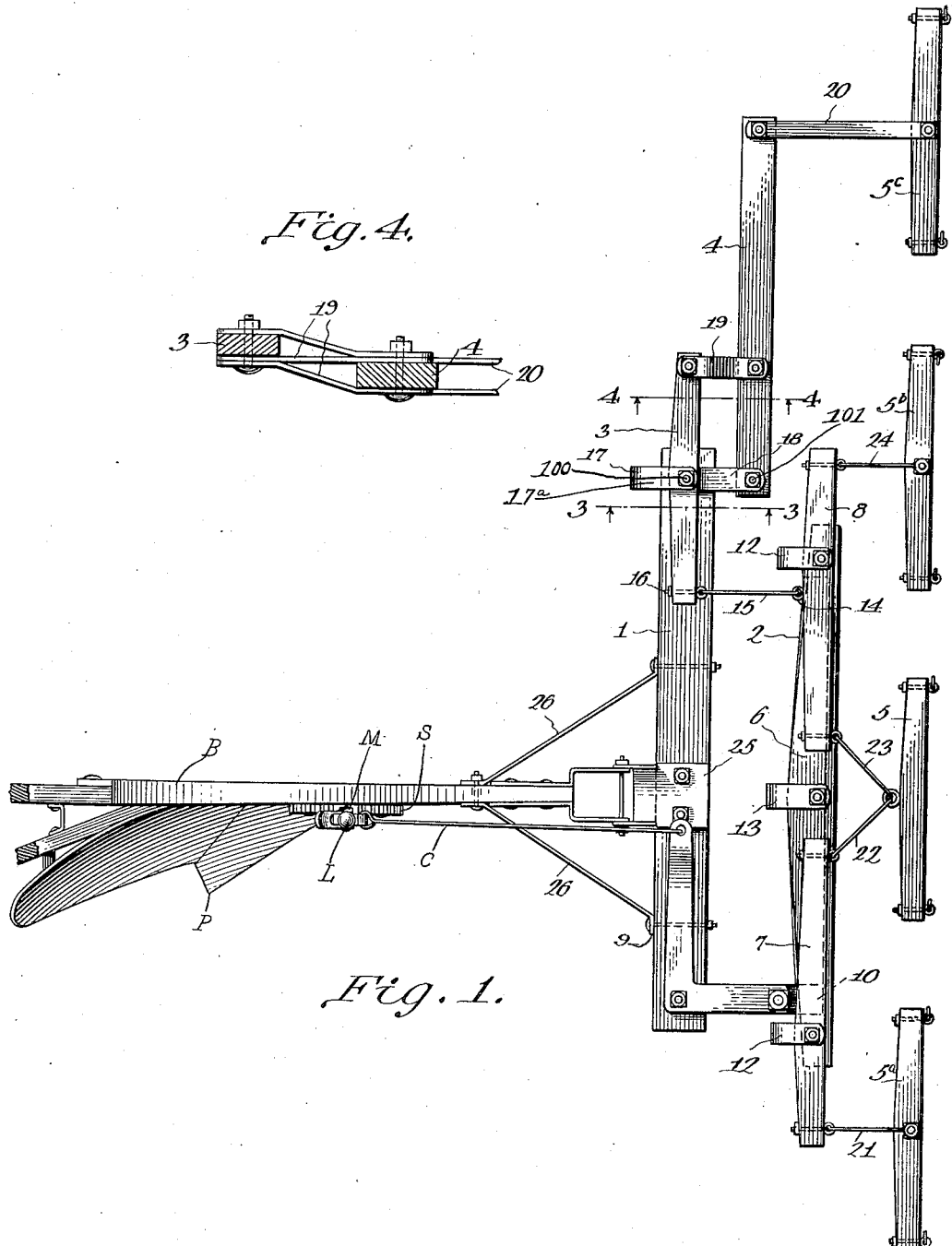
Figure 2:
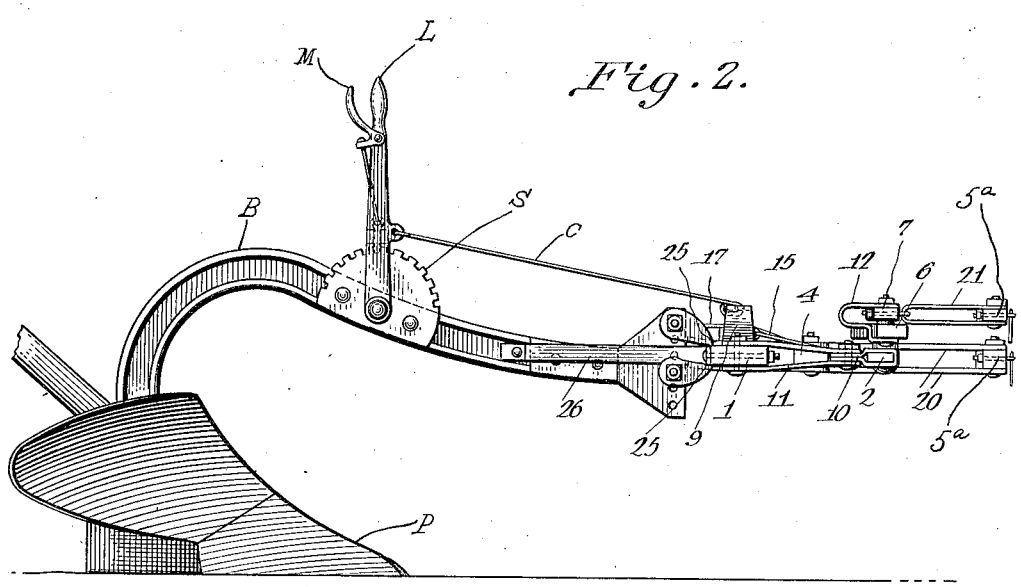
Figure 3:
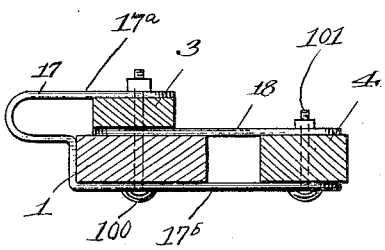

In the accompanying drawings:—Figure 1 is a top plan; Fig. 2 is a side elevation; Fig. 3 is a fragmental cross section on the line 3—3 of Fig. 1; Fig. 4 is a fragmental cross section on the line 4—4 of Fig. 1.

In the accompanying drawings there is shown a plow P, the beam thereof being denoted by the reference character B. The beam B supports a segment S to which is pivoted a lever L provided with latch mechanism M of any desired sort, coöperating with the segment S to hold the lever L in adjusted position. Mounted upon the forward end of the plow beam B is a clevis 25 attached to a main beam 1. Presupposing that the reader is facing in the direction in which the plow P is moving, the clevis 25 is secured to the main beam 1 at a point nearer to the right hand end of the beam than to the left hand end of the beam, the clevis 25, dividing the beam into unequal segments, the shorter segment projecting to the right of the clevis and the longer segment projecting to the left of the clevis. Braces 26 diverge from the plow beam B and are secured to the main beam 1.

A primary lever 2 is located in front of the main beam 1. Attached to the right hand end of the primary lever 2 is a clevis 10, the rear end of which is pivoted to a clevis 11, the clevis 11 being attached to the right hand end of the main beam 1. A bell crank lever 9 is fulcrumed on the right hand end of the beam 1, the bell crank lever comprising a forwardly extending arm which is pivotally connected with the securing element which unites the clevises 10 and 11. In this manner, the bell crank lever 9 is connected with the primary lever 2 so as to move the same longitudinally, and in a direction substantially parallel to the main beam 1. A connection C unites the extremity of this last specified segment of the bell crank lever 9 with the latch lever L.

Mounted on the primary lever 2 at a point intermediate its ends is a clevis 13, connected with the central point of a triple tree 6. The triple tree 6 carries adjacent its ends, clevises 12, supporting double trees 7 and 8. The outer ends of the double trees 7 and 8 are shorter than the inner ends thereof. A link 22 is secured to the inner end of the double tree 7 and a link 23 is secured to the inner end of the double tree 8 and these links converge and pivotally unite with a swingle tree 5. A link 21 affords union between the outer end of the double tree 7 and the intermediate portion of a swingle tree $5^a$. A link 24 affords a pivotal union between the outer end of the double tree 8 and the intermediate portion of a swingle tree $5^b$.

A clevis 17 is attached to the left hand end of the main beam 1, the clevis 17 including an upper arm $17^a$ and a lower arm $17^b$. A pivot element 100 passes through the arms $17^a$ and $17^b$ of the clevis 17 and affords a pivotal mounting for an auxiliary tree 3, the tree 3 being pivotally supported at a point midway between its ends. An eye bolt 16 is mounted upon the right hand end of the auxiliary tree 3 and is connected through the medium of a link 15 with an eye bolt 14 mounted on the left hand end of the primary lever 2. Supported upon the main beam 1 and alined vertically with the forwardly extended lower arm $17^b$ of the clevis 17 is a link 18, there being a pivot element 101 connecting the arm 17ᵇ and the link 18. The right hand end of a secondary lever 4 is pivoted upon the element 101. A three-part connection shown in Fig. 4 and indicated by the reference character 19, unites the left hand end of the auxiliary tree 3 pivotally with the intermediate portion of the secondary lever 4, that part of the lever 4 which lies to the left of the connection 19 being longer than that part of the lever which lies to the right of the connection. Pivoted to the outer end of the secondary lever 4 are links 20, the forward ends of the links 20 being connected to the central point of a swingle tree 5ᶜ.

The efforts of the three draft animals attached to the swingle trees 5, 5ᵃ and 5ᵇ are transmitted to the double trees 7 and 8, thence to the triple tree 6 and from the triple tree 6 by way of the clevis 13 to the intermediate portion of the primary lever 2. From the primary lever 2 the pull is transmitted to the right hand end of the bar 1 through the clevises 10 and 11. From the left hand end of the primary lever 2, the pull is transmitted through the link 15 to the right hand end of the auxiliary tree 3, this pull being offset by the pull of the single draft animal attached to the draft tree 5ᶜ, from which element the pull will be transmitted by the links 20, to the secondary lever 4 and by way of the clevis 19 to the auxiliary tree 3. In this manner, the pull will be equitably and evenly divided among the several draft animals.

When it is desired to regulate the width of the furrow-slice, the lever L may be moved upon the segment S actuating the connection C to impart a movement to the bell crank lever 9, the latter producing relative parallel movement between the main beam 1 and the primary lever 2 and attendant parts.

Having thus described the invention, what is claimed is:—

1. In a draft equalizer, a main beam; a primary lever pivotally connected at its outer end to one end of the main beam; a draft tree pivoted to the intermediate portion of the primary lever; a supplemental tree pivoted between its ends to the other end of the main beam; a connection between the inner end of the supplemental tree and the inner end of the primary lever; a secondary lever pivotally connected at its inner end to said other end of the main beam; a connection between the intermediate portion of the secondary lever and the outer end of the supplemental tree; and a draft tree pivoted to the outer end of the secondary lever.

2. In a draft equalizer, a main beam; a primary lever pivotally connected at its outer end to one end of the main beam; a draft tree pivoted to the intermediate portion of the primary lever; a supplemental tree pivoted between its ends to the other end of the main beam; a connection between the inner end of the supplemental tree and the inner end of the primary lever; a secondary lever pivotally connected at its inner end to said other end of the main beam; a connection between the intermediate portion of the secondary lever and the outer end of the supplemental tree; a draft tree pivoted to the outer end of the secondary lever; and a lever fulcrumed on the main beam and pivoted to the primary lever adjacent the connection between the primary lever and the main beam.

3. In a draft equalizer a main beam; a supplemental tree pivoted intermediate its ends to one end of the main beam; a secondary lever pivoted to the main beam; a connection between the outer end of the supplemental tree and the intermediate portion of the secondary lever; a primary lever pivoted at its outer end to the other end of the main beam; a connection between the inner end of the primary lever and the inner end of the supplemental tree; and means carried by the main beam and operably connected to the primary lever for producing relative movement between the primary lever and the main lever in a direction approximately parallel to the main beam.

In testimony that I claim the foregoing as my own, I have hereto affixed my signature in the presence of two witnesses.

RICHARD I. SMITH.

Witnesses:
F. L. CHASE,
FRANK HAZEN.

Copies of this patent may be obtained for five cents each, by addressing the "Commissioner of Patents, Washington, D. C."